Dec. 25, 1956    W. A. ANDERSON    2,775,289
JACK ACTUATED DEVICE FOR REMOVING TIRES
FROM VEHICLE ATTACHED WHEELS
Filed Feb. 18, 1954    2 Sheets-Sheet 1

INVENTOR
Walter A. Anderson
by
George H. Kennedy
Attorney

Dec. 25, 1956     W. A. ANDERSON     2,775,289
JACK ACTUATED DEVICE FOR REMOVING TIRES
FROM VEHICLE ATTACHED WHEELS
Filed Feb. 18, 1954     2 Sheets-Sheet 2
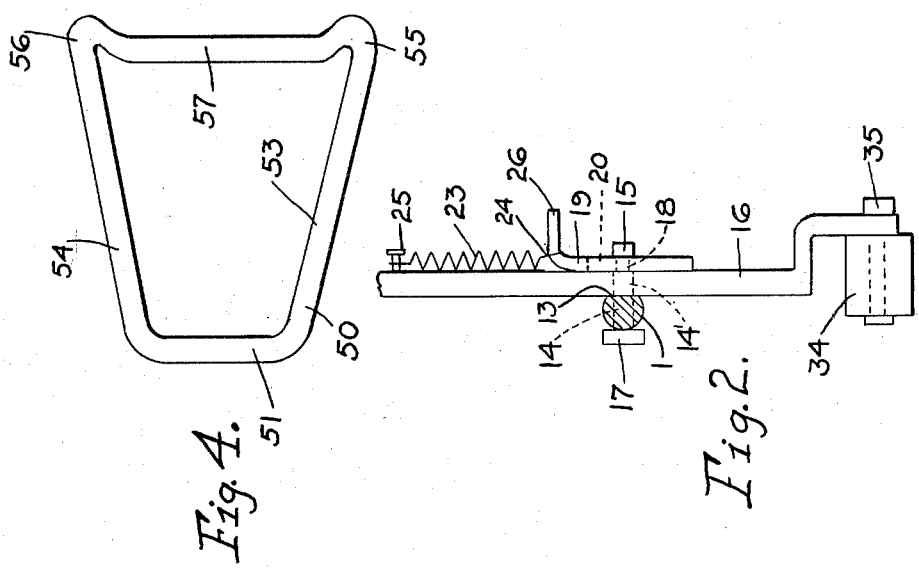
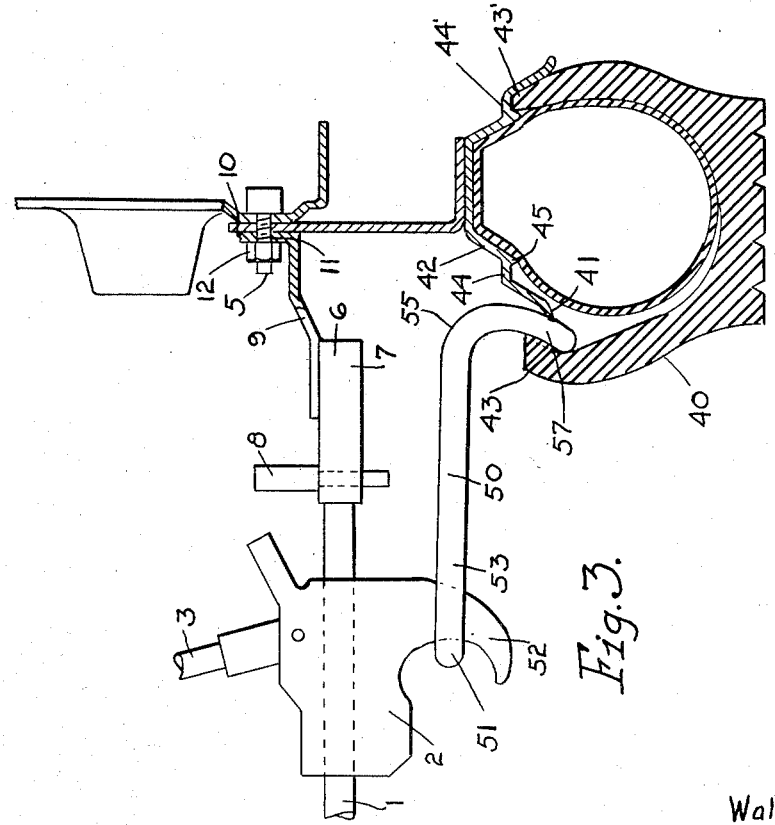
INVENTOR
Walter A. Anderson
by
George H. Kennedy
Attorney

United States Patent Office 2,775,289
Patented Dec. 25, 1956

2,775,289

JACK ACTUATED DEVICE FOR REMOVING TIRES FROM VEHICLE ATTACHED WHEELS

Walter A. Anderson, Worcester, Mass.

Application February 18, 1954, Serial No. 411,088

4 Claims. (Cl. 157—1.1)

This invention relates to a tool designed for use in removing automobile tires from the wheels upon which they have been secured. More particularly, this invention relates to a tool capable of use in removing tires from wheels which are securely attached to the automobile.

It is an important object of this invention to provide a tool of this type which will permit the demounting of the tire from the wheel while the latter is attached to the vehicle.

Another object of the invention is to provide a single device capable of breaking both beads of a tire in a simple two-stage, push-pull operation.

Another object of the invention is to provide a device which is simple, portable and relatively inexpensive.

Other and further objects will appear as the description of the invention proceeds.

The common practice today in removing tires from their wheels involves, first of all, the detaching of the wheel from the automobile. The wheel is then placed flat on the floor so that the beads of the tire may be dislodged from their corresponding bead beds of the rim. This is effected by means of a tool similar to that shown in U. S. Patent No. 2,433,113 granted to Graves et al. The bead is first "broken" on one side of the tire; then the wheel is flopped over and the bead is "broken" on the other side of the tire. Now, by means of a flat prying tool (called a "tire tool"), the tire is removed from the rim of the wheel. This procedure is followed in most gas-stations throughout the country.

There are, of course, other more complicated, more expensive, and less commonly used tools for demounting tires. For example, there is the type of apparatus which is in the form of a horizontal table supported above the floor upon a vertical column. The tire demounting tools in this case are generally implements which may be attached directly to the table itself. Again, in order to use this apparatus it is necessary to remove the wheel from the automobile.

It is undertood that it is possible by means of tire-tools and mallets to demount a tire from the wheel without first removing the wheel from the vehicle, but this method involves cumbersome and back-breaking labor.

The present invention provides a machine which is inexpensive, easy to operate, and much faster than the prior art devices.

The above and other advantageous features of the invention will hereinafter more fully appear from the following description, considered in connection with the accompanying drawings, in which, Fig. 1 is a front elevation of the apparatus as it would be set up for the first bead breaking operation.

Fig. 2 is a vertical section across the horizontal bar showing the arrangement of the bar, lever member and corresponding connecting elements.

Fig. 3 is a sectional front elevation of the apparatus as it would be set up for the second bead breaking operation.

Fig. 4 is a plan view of the tool used in connection with the apparatus of Fig. 3.

Figure 1:
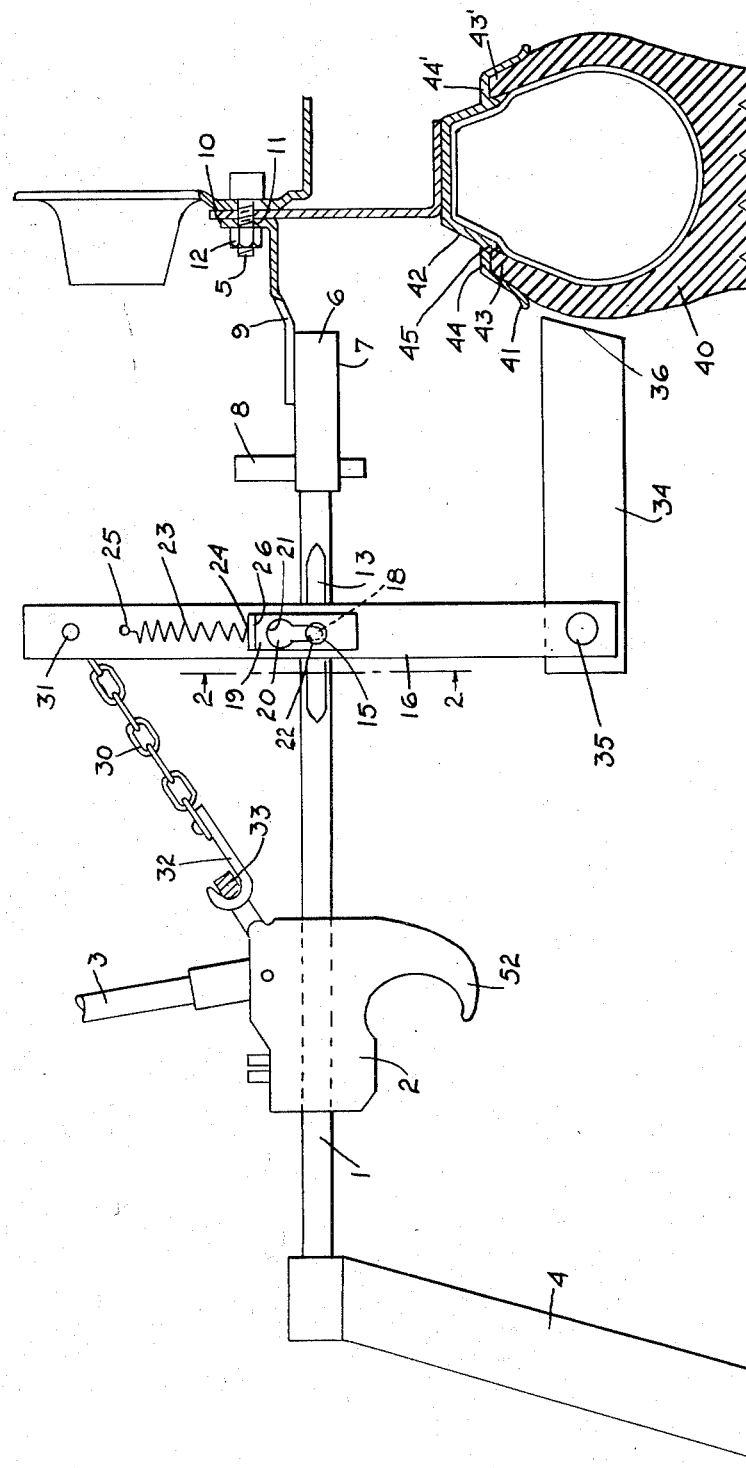

Referring to the drawings in detail, reference numeral 1 indicates a substantially horizontal steel bar along which jack member 2 slides in accordance with the movement of jack handle 3. Horizontal bar 1, which is of circular cross-section, is supported from the floor at its left-hand end by means of support 4. Horizontal bar 1 is supported at its other end by wheel lug 5 through connecting member 6. The latter is composed of a small steel rod 7 hollowed out at one end and adapted to receive the end of horizontal bar 1. A suitable pin 8 passes through corresponding holes in the rod and bar so as to secure them together. Connecting member 6 also includes a short steel rod 9 of rectangular cross section which is welded at one end to the other rod and which is bent at the other end at a right angle so as to form vertical flat surface 10. Hole 11 is drilled in this flat surface so as to provide a means for securing the connecting member to lug 5. When hole 11 is placed over the lug 5, nut 12 is screwed onto the lug, thus anchoring the device firmly to the hub of the wheel.

Part of the way down the horizontal bar 1 (perhaps one eighth of the distance from the wheel to the support 4) is a vertical flat surface 13 formed by cutting out a longitudinal slice from the bar. In the center of this flat surface (see now Fig. 2), which is preferably about four or five inches in length, is hole 14 which passes horizontally through the center of the bar transverse to the axis thereof. Pin 15 is adapted to pass through hole 14 of the bar and engage the corresponding hole 14' of lever member 16 on the same side of the bar as the flat surface. On the end of the pin 15 which engages the rounded portion of the horizontal bar is head 17 which is larger than holes 14 and 14', thus preventing the pin from passing all the way through the holes. Pin 15 is long enough to project beyond the outer edge of the lever member. On the projecting portion of the pin is annular groove 18. Locking member 19 has a slot 20 which is wide enough at its upper end 21 to pass over the projecting end of the pin but which is narrow enough at its lower end 22 to firmly engage the groove 18. Locking member 19 is held in the groove by the action of spring 23 which is bolted at one end 24 to the locking member and at the other end 25 to the lever member. Handle 26 of the locking member permits the raising or lowering of the locking member into or out of engagement with pin 15.

The lever member is pivoted at its center by pin 15. Chain 30 is bolted to the upper end of the lever member at 31. The lower end of chain 30 carries a hook 32 which fits through and engages eye portion 33 of jack member 2. Attached to the lower end of lever member 16 is horizontal thrust member 34 which is secured at one end to the lower end of lever member 16 by means of bolt 35.

The right-hand end of thrust member 34 is beveled slightly at 36 (see Fig. 1) so as to properly engage tire 40. The thrust member 34 is adjusted to engage the tire 40 at a point just below the lip 41 of wheel rim 42. The bead 43 of the tire is shown as being reposed in its corresponding bead bed 44 of rim 42. Inner rim projection 45 constitutes the safety rim feature common to Chrsyler-made automobiles. Thrust member 34 is of substantially square cross-section and is preferably made of wood so that it will not scratch the tire or rim.

Fig. 3 shows the apparatus at the start of the second phase of the bead breaking operation. Lever member 16 has been removed from the bar by disconnecting hook 32 from eye 33; locking member 19 has been released by pushing down on handle 26 and lifting the locking member over the end of pin 15. The pin 15 has been removed, and the whole thrust assembly including lever member 16 and thrust member 34 has been placed to one side. Tire pulling member 50 is made of one half inch round steel stock and bent according to the configuration shown in Figs. 3 and 4. Pulling member 50 has a short horizontal section 51 which engages hook portion 52 of jack member 2. Horizontal section 51 is secured at its ends to two horizontally diverging members 53 and 54 which are connected at their other ends to curved portions 55 and 56 respectively, as shown in Figs. 3 and 4. Horizontal section 57 which is parallel to section 51 is connected to the lower ends of curved portions 55 and 56. Horizontal section 57 engages the inner portion of tire 40 at a point below bead 43 for the start of the second bead breaking operation.

In order to remove a tire from the rim of the wheel in accordance with the invention, the hub-cap of the wheel is first removed, one of the lug nuts 12 is taken off and the automobile is then jacked up so as to provide clearance between the bottom of the tire and the floor. Any remaining air in the tire is let out. Connecting member 6 is now secured to the exposed lug bolt 5 by replacing the lug nut just removed. Horizontal bar 1 is inserted into the end of connecting member 6 and held secured by pin 8. By moving the handle 3 back and forth the jack member 2 is urged along the bar towards the support. The force produced by the jack member is transmitted through chain 30, through the lever member 16 and to the thrust member 34, which pushes against the tire 40 and bead 43. Continued urging of the jack member will cause bead member 43 to become dislodged from its bead bed 44 along the region of contact between the thrust member 34 and the tire. The remaining portion of the bead is then simply pushed out of the bead bed by hand.

By means of conventional tire tools, the thus loosened tire edge is easily pulled outside of the rim to the position shown in Fig. 3. The tire pushing assembly is removed from the apparatus by disconnecting hook 32 from eye 33, and by unlocking and removing pin 15 from horizontal bar 1. Horizontal portion 57 of pulling member 50 is inserted inside the tire. Jack member 2 is moved to the right along horizontal bar 1 until hook member 52 engages horizontal portion 51 of pulling member 50. The jack member is again urged to the left and the second bead 43' is pulled out of its bead bed 44'. The tire may now be pulled from the rim in a simple manner.

This apparatus admits of other obvious modifications all within the scope of the invention. The jack member, for example may be of any conventional type, such as a spring and disc type, a tooth and ratchet type or a hydraulic type.

By means of this invention the beads of the tire may be broken in a simple two-stage, push-pull operation. The outer bead is broken on the first stage by the pushing action and the inner bead is broken by the pulling action. The two actions cooperate through the medium of a single device to perform the hitherto difficult task of loosening a tire for its removal from the wheel.

The advantages of this invention are many. First of all, by means of the instant invention the tire may be removed and replaced in one-quarter of the time that it would ordinarily take with the prior art devices. Secondly, the operation is simple: through the use of a power-multiplying device such as the jack, the beads may be broken with little effort exerted by the operator. Again, since it is not necessary to remove the wheel from the vehicle, the wheel balance is not disturbed. Also, because it is not necessary to remove the wheel, the chances of the operator's clothes getting dirty are minimized. Due to the steady pressure, as opposed to the sharp blows of the prior art devices, the instant invention will not cut or pinch the tubes or tires. The apparatus is easily constructed, is inexpensive, and because of its light weight is also portable.

It should be pointed out here that the invention may be used to remove tires from wheels of all sizes, both on automobiles and trucks alike. By adjusting the angle between thrust member 34 and lever member 16 through bolt 35, the proper setting for any size wheel may be obtained.

It is interesting to note that many of the prior art devices, such as that described in United States Patent No. 2,433,113, referred to above, are ineffectual in breaking the beads of tires which are mounted on so-called "safety-rim" wheels (such as are used on Chrysler automobiles). The extra flange portion (see reference numeral 45 of Fig. 1) which constitutes the safety-rim feature of the wheel requires excessive pressures for the release of the bead from its bead bed. It is not possible to achieve these pressures with the prior art devices of the simple portable type. Through the use of the present invention which is capable of exerting great pressures by means of the jack member, the tires may be easily removed from safety-rim wheels. Of course, it should be added here that the instant invention will remove tires from all types of rims in a manner easier and quicker than those previously known.

Another important advantage of the present invention makes itself evident in the winter time, when it is desirable to replace ordinary tires with so-called "snow-treads." By means of the instant invention the garageman may quickly replace the regular tires with the snow-treads without having to remove either wheel.

I claim:
1. Apparatus for demounting tires from the wheels of automotive vehicles while the wheels are still attached to their respective vehicles, comprising a horizontal bar, a substantially vertical support means attached to one end of said bar, a connecting means mounted on the other end of said bar and adapted to secure said bar to the hub portion of a wheel upon which a tire is mounted, a force-multiplying means mounted on said bar, a lever pivotally mounted on said bar at a pivot point located intermediate the ends of said lever, a tire-engaging thrust member mounted at one end of said lever, and means connecting the other end of said lever to the force-multiplying means.

2. Apparatus for dislodging the beads of an automobile tire from their respective bead beds in the rim of a wheel, said wheel still being mounted on a vehicle, consisting of an elongated horizontal bar, a substantially vertical support means attached to one end of said bar, a connecting means mounted on the other end of said bar and adapted to secure said bar to the hub portion of said wheel, a force-multiplying means mounted on said bar, a lever means pivotally mounted on said bar for transmitting the force of said force-multiplying means to said tire so as to push the first bead from its bead bed, a tire pulling hook having a curved portion at one end adapted to be hooked over the said first bead and at its other end being adapted to engage said force-multiplying means for transmitting a second force from said force-multiplying means to said tire, so as to pull the second bead from its bead bed.

3. Apparatus for dislodging the beads of an automobile tire from their respective bead beds in the rim of a wheel, consisting of an elongated horizontal bar, a substantially vertical support means attached to one end of the bar, a connecting means mounted on the other end of said bar and adapted to engage a lug bolt of said wheel so as to secure said horizontal bar to said wheel, a jack means slidably mounted on said bar, said jack means being adapted to engage said bar for stepwise, force-producing movement along said bar in a direction away from said other end of said bar, a detachable lever pivotally mounted on said bar, said bar engaging said lever near the mid-point of said lever, a chain connecting one end of said lever with said jack means, and a thrust member attached to the other end of said lever and adapted to engage the side of said tire so as to push the first bead from its bead bed.

4. Apparatus according to claim 3 including a tire pulling means adapted to engage the inner side of said first bead and a hook portion of said jack, so as to pull the second bead from its bead bed.

References Cited in the file of this patent
UNITED STATES PATENTS

| | | |
|---|---|---|
| 416,500 | Robbins | Dec. 3, 1889 |
| 1,775,968 | Nelson | Sept. 16, 1930 |
| 2,212,768 | Bonneau | Aug. 27, 1940 |
| 2,416,195 | Mitchell | Feb. 18, 1947 |
| 2,439,135 | Johnson et al. | Apr. 6, 1948 |
| 2,470,534 | Thomas | May 17, 1949 |